United States Patent [19]
Jackson

[11] Patent Number: 5,515,952
[45] Date of Patent: May 14, 1996

[54] DRUM BRAKE ASSEMBLY INCLUDING BRAKE SHOES WITH MASS DAMPENING

[75] Inventor: Mark H. Jackson, Dearborn Heights, Mich.

[73] Assignee: Ford Motor Company, Dearborn, Mich.

[21] Appl. No.: 349,574

[22] Filed: Dec. 5, 1994

[51] Int. Cl.⁶ .................................................... F16D 65/08
[52] U.S. Cl. ........................................ 188/250 E; 188/378
[58] Field of Search ............................ 188/250 A, 250 B, 188/250 E, 378

[56] References Cited

U.S. PATENT DOCUMENTS

| | | | |
|---|---|---|---|
| 4,708,226 | 11/1987 | Egon et al. | 188/251 A |
| 4,773,512 | 9/1988 | Murakami | 188/250 E |
| 5,099,967 | 3/1992 | Lang | 188/328 |

FOREIGN PATENT DOCUMENTS

| | | | |
|---|---|---|---|
| 64569 | 5/1977 | Japan | 188/250 E |
| 13235 | 1/1983 | Japan | 188/378 |

*Primary Examiner*—Josie Ballato
*Attorney, Agent, or Firm*—Gregory P. Brown; Roger L. May

[57] ABSTRACT

A brake shoe (14) for an internal drum brake assembly (10) having a mass damper (60) is disclosed for attenuating objectionable noise. The mass damper (60) is attached to an arcuate table (40) of a brake shoe (14) at a predetermined location adjacent to an anti-node corresponding to a flutter mode of vibration. The mass damper (60) is disposed adjacent to an arcuate edge 56 of the arcuate table (40).

7 Claims, 1 Drawing Sheet

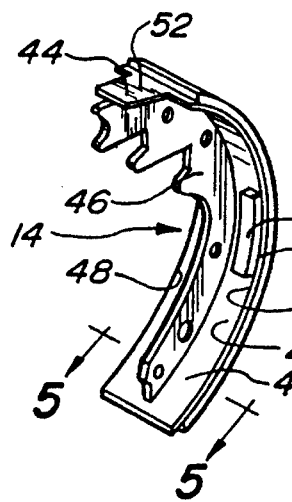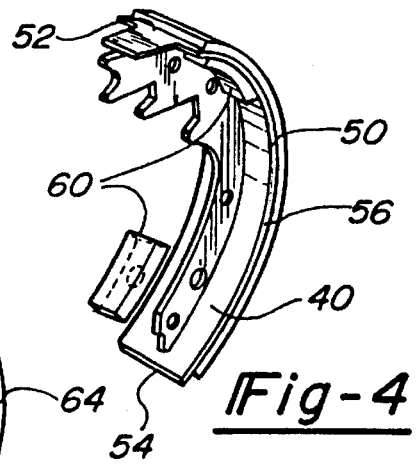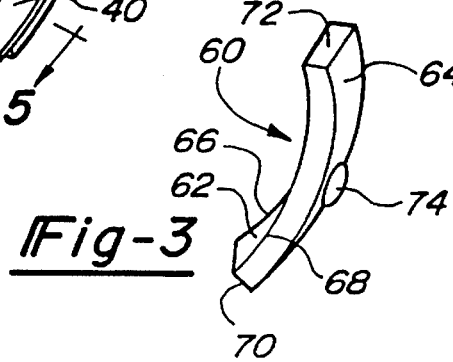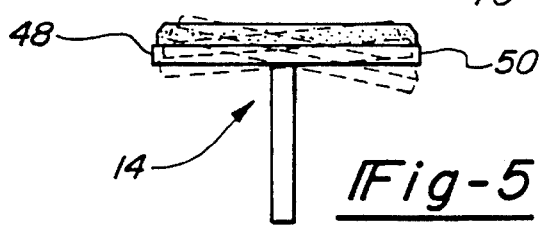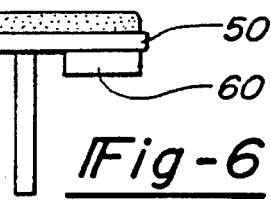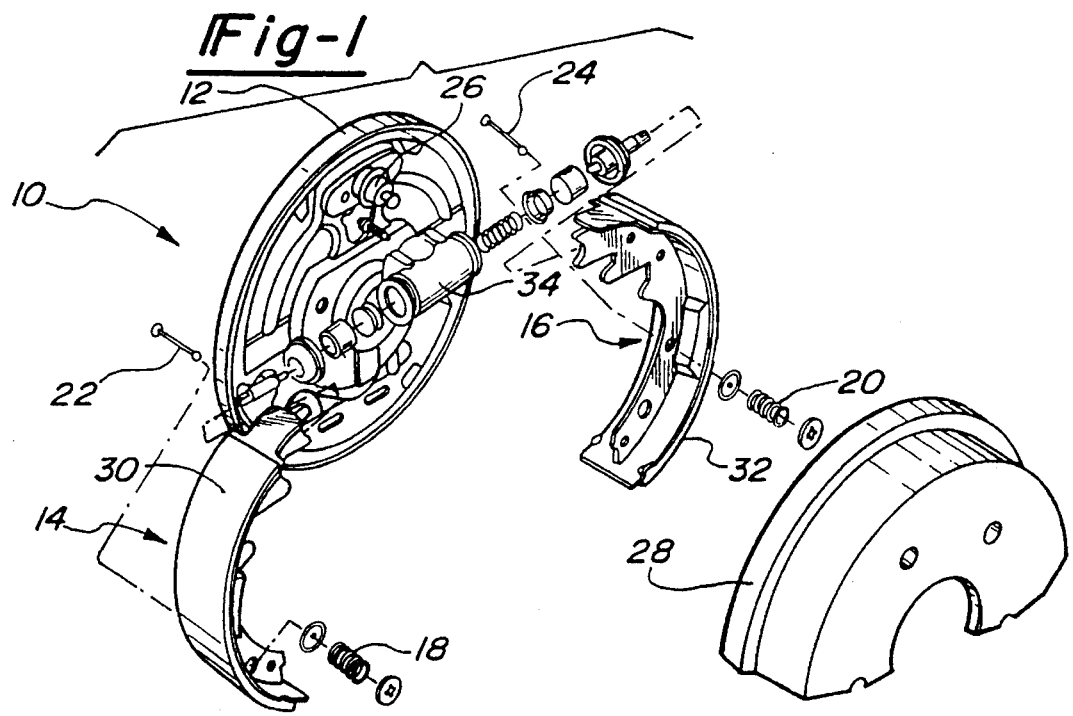

5,515,952

DRUM BRAKE ASSEMBLY INCLUDING BRAKE SHOES WITH MASS DAMPENING

BACKGROUND OF THE INVENTION

1. Field of the Invention

This invention relates generally to drum brakes for motor vehicles. More specifically, the present invention relates to a mass loaded drum brake shoe for attenuating objectionable noise from emanating from drum brake assemblies while in use.

2. Disclosure Information

Drum brake designers have directed significant effort toward reducing the generation of objectionable noise generated during braking application. Recently, as exemplified in U.S. Pat. No. 4,773,512, some of this effort has been directed to examining the contribution of the internal brake shoe to the generation of this noise or squeal. The '512 patent discloses non-uniform stiffening and reinforcing of the brake shoe to shift its natural frequency beyond that of the frequency of the objectionable noise being generated. Practicing this involves accurately placing several reinforcements between the brake shoe web and the table, or alternatively utilizing new blanks for the table to provide upturned flanges.

It would be desirable to reduce the objectionable noise generated by brake shoe in a drum brake assembly without requiring new blanks for the table or requiring precision positioning and welding of reinforcements at the intersection of the web and the table.

SUMMARY OF THE INVENTION

The present invention provides a brake shoe for a drum brake assembly, including a mass damper attached to the brake shoe for reducing objectionable noises from emanating therefrom.

In the presently preferred embodiment, the brake shoe comprises an arcuate table having inner and outer peripheries and a web fixed to the inner periphery of the table substantially midway between opposite arcuate edges of the arcuate table. There is also a lining secured to the outer periphery of the arcuate table, the lining being operative to effect braking contact with a brake drum. The brake shoe also includes a mass damper positioned on the inner periphery of the arcuate table, adjacent to one of the arcuate edges.

It is an advantage of the mass damper to attenuate torsional vibration of the brake shoe and thereby reduce objectionable noises emanating therefrom.

Other objects, features and advantages of the present invention will become apparent to those skilled in the art from the drawings, detailed description and claims which follow.

BRIEF DESCRIPTION OF THE DRAWINGS

FIG. 1 is an exploded view of an internal drum brake assembly having brake shoes fitted with mass dampers according to the present invention.

FIG. 2 is a perspective view of a brake shoe having a mass damper according to the present invention.

FIG. 3 is a perspective view of a mass damper in the form of an arcuate plate according to the present invention.

FIG. 4 is a perspective view of an alternative embodiment of a brake shoe requiring two mass dampers according to the present invention.

FIG. 5 is a sectional view taken from FIG. 2 showing an arcuate table undergoing a flutter mode of vibration.

FIG. 6 is a sectional view taken from FIG. 3 showing a mass damper disposed along an arcuate edge of an arcuate table to attenuate a flutter mode of vibration according to the present invention.

DETAILED DESCRIPTION OF THE PREFERRED EMBODIMENTS

Referring now to the figures, FIG. 1 illustrates a drum brake assembly 10 for a motor vehicle. The drum brake assembly 10 includes a brake backing plate 12 having a primary brake shoe 14 and a secondary brake shoe 16 pivotally secured to the backing plate 12 by steady rest springs 18, 20 and pins 22, 24. An anchor pin 26 is rigidly attached to the backing plate 12. A brake drum 28 surrounds the brake shoes 14, 16 in spaced relation and attaches to a rotating wheel assembly (not shown). Brake linings 30, 32 on the brake shoes 14, 16 are moved against an inner surface of the brake drum 28 by a wheel cylinder 34 for frictionally stopping the motor vehicle.

FIG. 2 illustrates the primary brake shoe 14, which will now be described, it being understood that the secondary brake shoe 16 is a mirror image of the primary brake shoe 14 for the purposes of this description. The brake shoe 14 includes an arcuate table 40 having a web 46 fixed to an inner periphery 42 substantially midway between opposite arcuate edges 48, 50 of the arcuate table 40. The arcuate table 40 further includes an outer periphery 44 to which the lining 30 is fixed between first and second ends 52, 54 of the arcuate table 40. The brake shoe 14 also includes a mass damper, shown in the presently preferred form of an arcuate slug or plate 60, fixed to the inner periphery 42 of the arcuate table 40.

Referring to FIGS. 2 and 3, the mass damper provides a concentrated location of mass, that may be shaped as required for packaging the neighboring components within the drum brake assembly 10. In the preferred embodiment, the arcuate plate 60 includes inner and outer peripheries 62, 64 about one quarter of an inch apart and parallel to the inner periphery 42 of the arcuate table 40. The arcuate plate 60 further includes opposite arcuate edges 66, 68 about one inch apart and first and second ends 70, 72 about two and a half inches apart. The present invention is not so limited, however, as various shaped slugs of material are contemplated for conforming within the limited space available in the drum brake assembly 10. One such example contemplated includes a cylindrical body having one end resiliently attached to the internal periphery 42 of the arcuate table 40.

A protuberance 74 projects from the outer periphery 64 of the arcuate plate 60 toward the inner periphery 42 of the arcuate table 40. In the preferred embodiment, the arcuate plate 60 is stamped from mild steel, which allows the protuberance 74 to be projection welded to the inner periphery 42 of the arcuate table 40 when constructed from a weld compatible material. This provides the most cost effective manner of attaching the mass damper to the arcuate table 40, however, the present invention is not so limited. Alternative fastening techniques may be required for materials not capable of welding. For example, the mass damper may be bonded, riveted or secured by a threaded fastener while providing the equivalent function and operability.

Referring now to FIGS. 5 and 6, the position of the mass damper on the arcuate table 40 is preferably determined through testing the drum brake assembly 10. Generally, when an objectionable noise, in the frequency range of 8–14 khz, emanates from the drum brake assembly 10 during operation it can be traced, at least in part, to a torsional vibration mode of the brake shoe 14. This vibration mode is characterized in that the arcuate table 40 undergoes what is referred to as flutter. At a characteristic frequency unique for each drum brake design, the opposite arcuate edges 48, 50 at a particular point between the first and second ends 52, 54 of the arcuate table 40 experience an out-of-phase sinusoidal displacement. This point is referred to as an anti-node. As shown in FIG. 6, it is desirable to place the mass damper as close to the anti-node as possible to accomplish the greatest attenuation of the flutter, thereby reducing the noise emanating therefrom.

Referring to FIGS. 2 and 3, testing has indicated that for a brake shoe 14 having an arcuate table 40 being twelve inches between first and second ends 52, 54 and three inches between opposite edges 48, 50, the arcuate plate 60 is best positioned midway between the first and second ends 52, 54 adjacent to one of the opposite edges, 48, 50. As can be seen in FIG. 4, for a brake shoe 14 having an arcuate table 40 being twelve and one-eighth inches between with first and second ends 52, 54 and three and one-half inches between opposite edges 48, 50, two arcuate plates 60 are preferred. A first arcuate plate is positioned substantially midway between a first end 52 and a midpoint 56 of the arcuate table 40, and a second arcuate plate 60 is positioned substantially midway between a second end 54 and the midpoint 56 of the arcuate table 40.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of my invention.

I claim:

1. A brake shoe for use in a drum brake of a motor vehicle, said brake shoe comprising:

an arcuate table having inner and outer peripheries;

a web fixed to the inner periphery of said table substantially midway between opposite arcuate edges of said arcuate table;

a lining secured to said outer periphery of said table, said lining being operative to effect braking contact with a brake drum; and a mass damper positioned on said inner periphery of said arcuate table, adjacent to an anti-node on said arcuate edge, said mass damper being operative to attenuate torsional vibration of said brake shoe and thereby reduce objectionable noises emanating therefrom.

2. A brake shoe according to claim 1, wherein said mass damper further comprises an arcuate slug positioned midway between first and second ends of said arcuate table.

3. A brake shoe according to claim 2, wherein said arcuate slug further comprises:

an arcuate plate having inner and outer peripheries parallel to said inner and outer peripheries of said arcuate table;

a protuberance projecting from said outer periphery of said arcuate plate toward said inner periphery of said arcuate table, said protuberance adapted to be projection welded to said arcuate table.

4. A brake shoe according to claim 3, wherein said arcuate plate is constructed from mild steel.

5. A brake shoe according to claim 1, wherein said mass damper further comprises a first arcuate slug positioned substantially midway between a first end and a midpoint of said arcuate table, and a second arcuate slug positioned substantially midway between a second end and said midpoint of said arcuate table.

6. A brake shoe according to claim 1, wherein said mass damper is projection welded to said arcuate table.

7. A brake shoe for use in a drum brake of a motor vehicle, said brake shoe comprising:

an arcuate table having inner and outer peripheries;

a web fixed to the inner periphery of said table substantially midway between opposite arcuate edges of said arcuate table;

a lining secured to said outer periphery of said table, said lining being operative to effect braking contact with a brake drum; and an arcuate plate having inner and outer peripheries parallel to said inner and outer peripheries of said arcuate table;

a protuberance projecting from said outer periphery of said arcuate plate, said protuberance adapted to facilitate projection welding said arcuate plate to said inner periphery of said arcuate table midway between first and second ends of said arcuate table, adjacent to one of said arcuate edge, said arcuate plate being operative to attenuate torsional vibration of said brake shoe and thereby reduce objectionable noises emanating therefrom.

* * * * *